United States Patent [19]
Tarry

[11] Patent Number: 5,443,917
[45] Date of Patent: Aug. 22, 1995

[54] CERAMIC ARMOR

[75] Inventor: Christopher A. Tarry, Natick, Mass.

[73] Assignee: GTE Products Corporation, Danvers, Mass.

[21] Appl. No.: 705,279

[22] Filed: May 24, 1991

[51] Int. Cl.6 .......................... F41H 1/00; F41H 5/00; C04B 35/58; C04B 35/71
[52] U.S. Cl. .................................... 428/545; 428/546; 428/547; 501/96; 501/103; 296/188; 2/2.5; 75/228; 75/245; 75/249; 75/950
[58] Field of Search ............... 428/469, 498, 547, 548, 428/911, 545, 546, 547; 89/36.02; 501/96, 103; 296/188; 2/2.5; 75/228, 245, 249, 950

[56] References Cited

U.S. PATENT DOCUMENTS

| | | | |
|---|---|---|---|
| 3,633,520 | 1/1972 | Stiglich et al. | 109/82 |
| 3,741,733 | 6/1973 | Kieffer | 29/182.15 |
| 3,743,569 | 7/1973 | Wilkins et al. | 161/225 |
| 3,802,850 | 4/1974 | Clougherty | 29/182.2 |
| 3,804,034 | 4/1974 | Stiglich, Jr. | 109/80 |
| 3,828,699 | 8/1974 | Bowen | 109/80 |
| 4,239,536 | 12/1980 | Yamamoto et al. | 75/238 |
| 4,365,997 | 12/1982 | Jachowski et al. | 148/31 |
| 4,497,874 | 2/1985 | Hale | 428/551 |
| 4,788,167 | 11/1988 | Mathers et al. | 501/98 |
| 4,800,065 | 1/1989 | Christodoulou et al. | 420/129 |
| 4,869,974 | 9/1989 | Oskarsson et al. | 428/328 |
| 4,876,941 | 10/1989 | Barnes et al. | 89/36.02 |
| 4,996,119 | 2/1991 | Mae et al. | 428/698 |
| 5,167,876 | 12/1992 | Lem et al. | 252/602 |
| 5,185,195 | 2/1993 | Harpell et al. | 428/102 |
| 5,196,252 | 3/1993 | Harpell | 428/102 |

*Primary Examiner*—Donald P. Walsh
*Assistant Examiner*—Daniel Jenkins
*Attorney, Agent, or Firm*—James Theodosopoulos; Robert F. Clark

[57] ABSTRACT

A densified ceramic or cermet armor material comprises greater than fifty percent by weight titanium nitride or greater than eight percent by weight of a mixture of titanium nitride and aluminum nitride to impart low compressive strength to said armor material and may additionally comprise components suitable for densification with said titanium nitride or titanium nitride-aluminum nitride mixture where the resulting armor material has high density and low porosity with a Young's modulus greater than 200 GPa and a compressive strength of less than 5.5 GPa.

17 Claims, 5 Drawing Sheets

CERAMIC ARMOR

This specification incorporates data that was generated under U.S. Government Contract Number DE-AC04-87AL42544.

Ceramic Armor is currently used for a variety of protective purposes, particularly against lower caliber threats. Where weight is of critical importance ceramics prove superior to metals which have the disadvantage of having high density. The primary application of ceramics has thus far been in personnel and aircraft armor. Materials typically used for such armor are ceramics having high hardness such as Alumina, Silicon Carbide, and Boron Carbide. Due to the difficulty of achieving complete densification of these refractory materials, as required for the best ballistic performance, ceramic armor is commonly manufactured using a hot pressing process. The ceramic is normally provided in the form of rectangularly shaped tiles; primarily due to the shape limitations of this densification process. Ceramic tiles have been structured in a variety of ways to enhance their performance; bonded to a ductile metal plate such as aluminum alloy; laminated to an energy absorbing backup material such as resin impregnated fiber glass or woven roving; embedded in metal or polymer matrices; wrapped or encapsulated in woven cloth made from glass fibers or polymer fibers such as Kevlar polyamide.

Ceramic Armor also has potential application against greater threats such as Tungsten and Depleted Uranium so called heavy metal penetrators. Ballistic testing of a limited range of ceramics typically considered for armor has established that among these materials, for a given tile thickness, Titanium Diboride is the most effective ceramic against any type of projectile. An important consideration for ceramic application as heavy armor is again the mass rather than the thickness or volume of material required to defeat the penetrator, hence materials are typically compared on the basis of their "mass efficiencies". When comparison is made on this basis Titanium Diboride ceramics are still the most efficient materials against heavy metal penetrators, however, against lesser threats such as steel projectiles other materials sometimes exhibit higher mass efficiencies. Heretofore, it is not believed that a satisfactory explanation for this superior performance has been put forward, other than that Titanium Diboride possesses high values for most mechanical properties generally considered to be of importance to ballistic performance. Such properties include elastic impedance, hardness, and toughness as proposed by Wilkins et al, "Fourth Progress Report of Light Armor Program" UCRL 50694, or effective compressive strength as proposed by Rosenberg and Yeshurun "The Relation Between the Ballistic Efficiency and Compressive Strength of Ceramic Tiles" Int. J. Impact Engineer, 7 357–362 (1988). Hence, the prior art is deficient on describing which ceramics to use for armor and the properties of a ceramic which are desirable for the best ballistic performance.

SUMMARY OF INVENTION

An object of the present invention is to disclose the concept that ballistic performance can be related to two mechanical properties of ceramic materials; elastic modulus and compressive strength. The combination of a high elastic modulus with a low compressive strength yields the best performance. The concept that a low compressive strength benefits ballistic efficiency is contrary to the teaching the of the prior art.

It is a further object of this invention to provide a lightweight ceramic or cermet armor material which is particularly effective against heavy metal penetrators.

It is a further object of this invention to provide a lightweight ceramic or cermet armor material which is economical to manufacture.

In accordance with the present invention, there is provided a densified ceramic armor material comprising greater than forty percent by weight titanium nitride to impart low compressive strength to said armor material and additional components suitable for densification with said titanium nitride, said armor material having high density and low porosity with a Young's modulus greater than 200 GPa and a compressive strength of less than 5.5 GPa. The additional components may include sintering aids to enhance densification of said ceramic armor material, and/or ceramic materials to enhance the mechanical properties of the armor material, for example by grain structure refinement. A densified cermet armor material may be produced when additional metal components such as aluminum, iron, nickel, cobalt, molybdenum and mixtures thereof are utilized.

Also in accordance with the present invention, a densified ceramic armor material comprises from about 6 to about 96 percent by weight titanium nitride and from about 2 to about 90 percent by weight aluminum nitride wherein said titanium nitride and said aluminum nitride have a combined percent by weight of greater than about 80 percent by weight. According to another embodiment, the densified ceramic armor material comprises from about 40 to about 96 percent by weight titanium nitride and from about 2 to about 60 percent by weight silicon nitride wherein said titanium nitride and said silicon nitride have a combined percent by weight of greater than about 80 percent by weight. According to another embodiment, the densified ceramic armor material comprises from about 40 to about 96 percent by weight titanium nitride and from about 2 to about 60 percent by weight tetragonal zirconia polycrystal wherein said titanium nitride and said tetragonal zirconia polycrystal have a combined percent by weight of greater than about 80 percent by weight.

Another desirable densified ceramic armor material comprises a body having an impact receiving surface and an oppositely positioned surface, said body adjacent said impact receiving surface comprising a major portion by weight titanium nitride and said body adjacent said oppositely positioned surface comprising a major portion by weight aluminum nitride, said impact receiving surface having a Young's Modulus greater than about 400 MPa and a density greater than about 4.8 grams cm$^{-3}$, said oppositely positioned surface having a Young's Modulus greater than about 300 MPa and a density less than about 3.7 grams cm$^{-3}$ whereby there is a gradation of the body composition, density and Young's Modulus from the impact receiving surface to the opposite surface, and said body exhibits a low compressive strength throughout and a lower total mass than a body fabricated entirely from the composition of the impact face; said armor material may comprise additional components suitable for densification with said titanium nitride and said aluminum nitride.

Another desirable densified ceramic armor material comprises a body having an impact receiving surface and an oppositely positioned surface, said body adjacent said impact receiving surface comprising a major portion by weight titanium nitride and said body adjacent said oppositely positioned surface comprising a major portion by weight silicon nitride, said impact receiving surface having a Young's Modulus greater than about 400 MPa and a density greater than about 4.8 grams $cm^{-3}$, said oppositely positioned surface having a Young's Modulus greater than about 300 MPa and a density less than about 3.7 grams $cm^{-3}$ whereby there is a gradation of the body composition, density, and Young's Modulus from the impact receiving surface to the opposite surface, and said body provides low compressive strength on the impact side with higher tensile and compressive strength on the opposite side and a lower total mass than a body fabricated entirely from the composition of the impact face; said armor material may comprise additional components suitable for densification with said titanium nitride and said silicon nitride.

An additional densified ceramic armor material comprises a body having an impact receiving surface and an oppositely positioned surface, said body adjacent said impact receiving surface comprising a major portion by weight titanium nitride and said body adjacent said oppositely positioned surface comprising a major portion by weight tetragonal zirconia polycrystal, said impact receiving surface having a Young's Modulus greater than about 400 MPa and a density greater than about 4.8 grams $cm^{-3}$, said oppositely positioned surface having a Young's Modulus greater than about 200 MPa and a density less than about 6.1 grams $cm^{-3}$ whereby there is a gradation of the body composition density and Young's Modulus from the impact receiving surface to the opposite surface, and said body provides low compressive strength on the impact side and high tensile and compressive strength on the opposite side; said armor material may comprise additional components suitable for densification with said titanium nitride and said tetragonal zirconia polycrystal.

DETAILED DESCRIPTION

From a thorough investigation of the mechanical properties of a range of structural ceramics, one property has been discovered which sets $TiB_2$ apart from other materials typically considered for use as armor. This particular property is also exhibited by TiN and AlN materials. Significantly, AlN has recently generated interest for use as armor despite its relatively low elastic modulus and hardness. The property of interest is that of compressive strength which is quite similar for many structural ceramic materials. $TiB_2$ and TiN materials however have been found to possess lower compressive strength.

Figure 1:
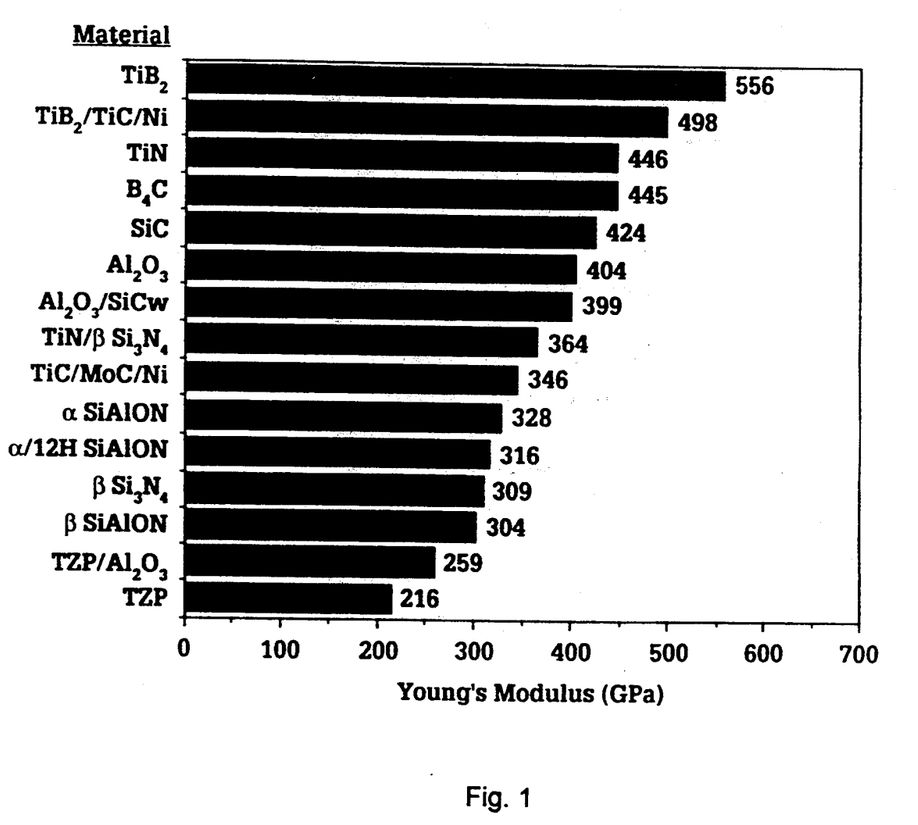
FIGS. 1 and 2 compare Young's Modulus and elastic impedance for a range of structural ceramic elements.
Figure 2:
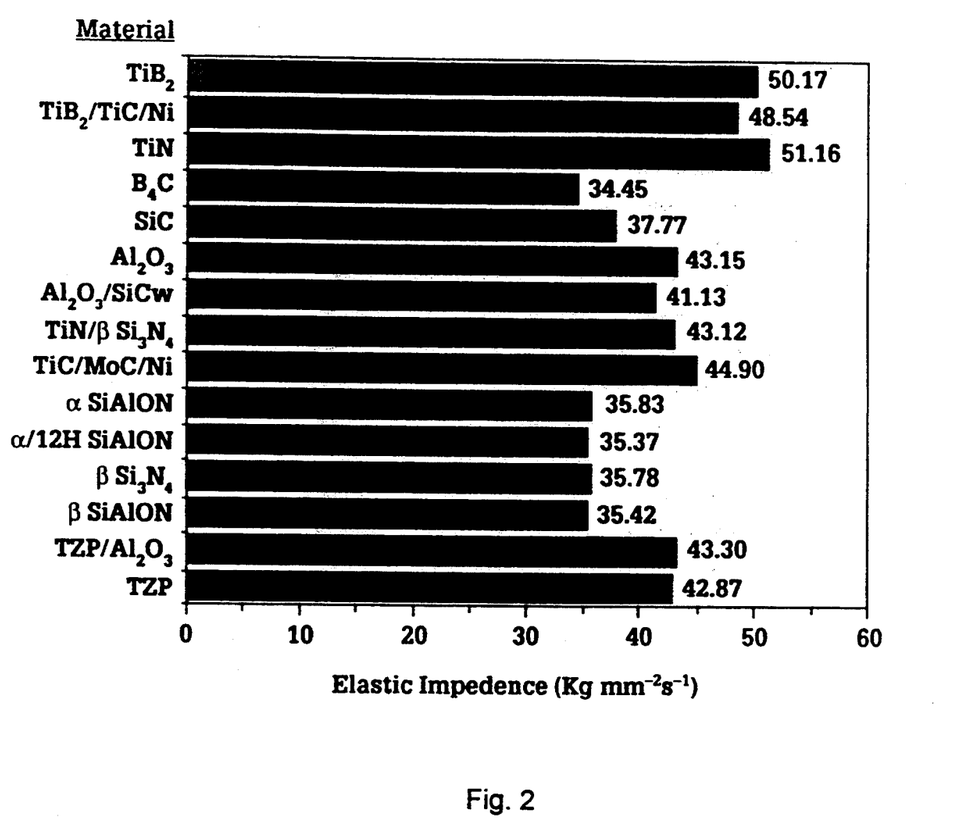
Figure 3:
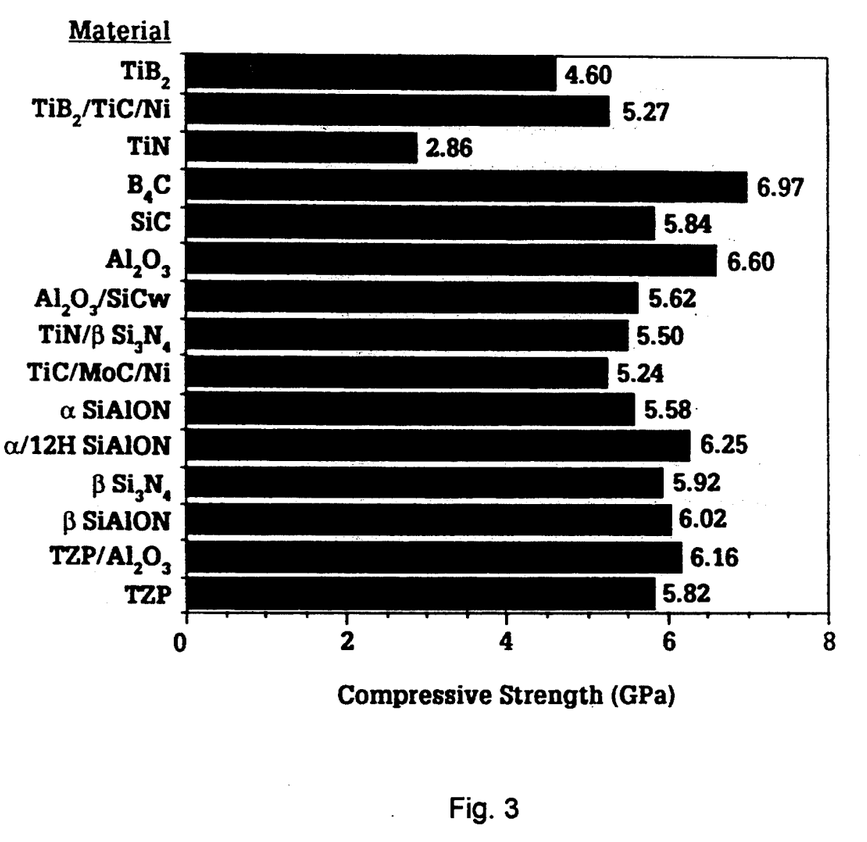
FIG. 3 compares compressive strength values for the same set of structural materials as FIGS. 1 and 2.
Figure 4:
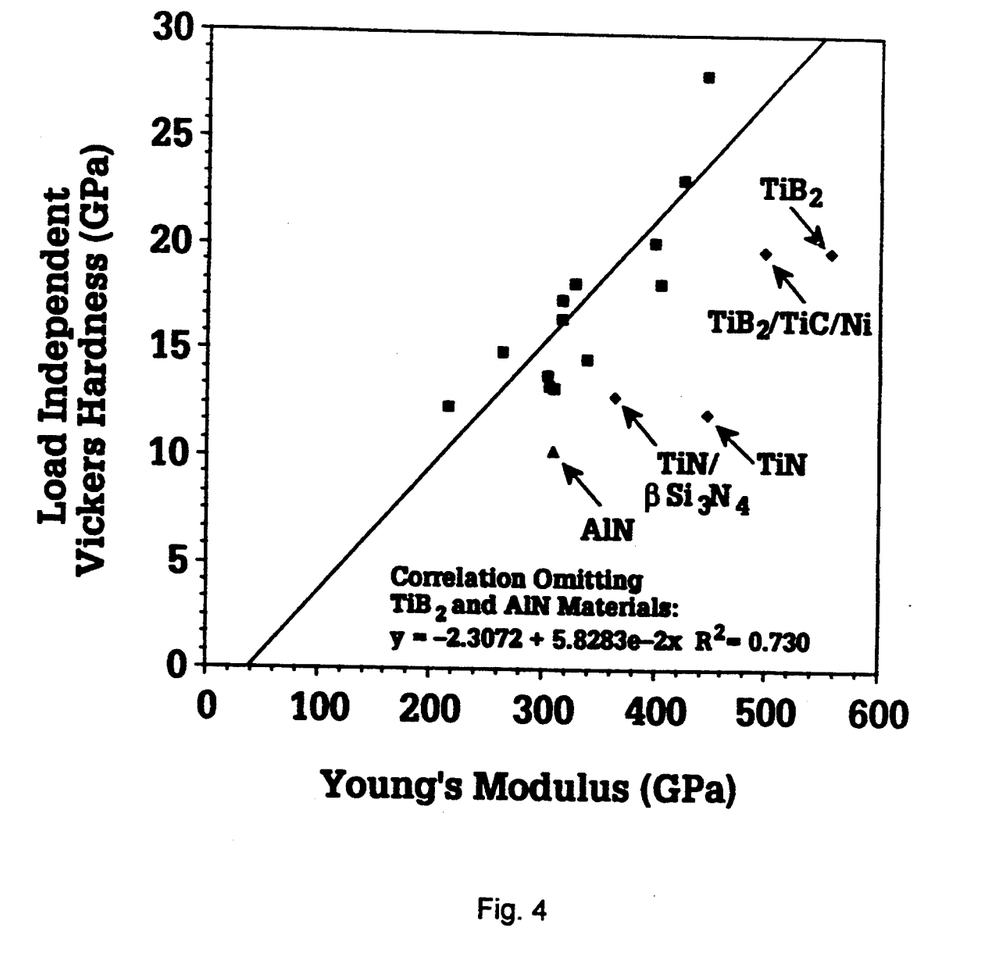
FIG. 4 illustrates the relationship found between Vickers Hardness and Young's Modulus.
Figure 5:
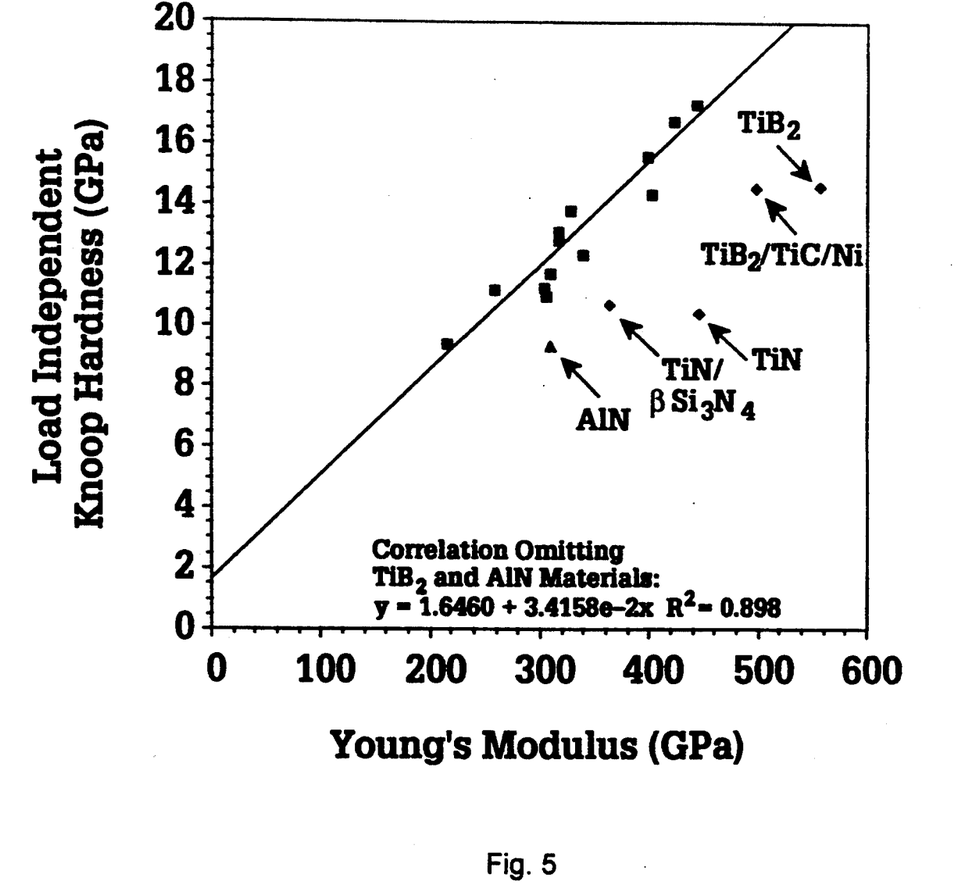
FIG. 5 illustrates the relationship between load independent Knoop hardness and Young's Modulus.

FIGS. 1 and 2 compare Young's Modulus and elastic impedance for a range of structural ceramic materials. These elastic properties were determined ultrasonically in accordance with ASTM standard E494. FIG. 3 compares compressive strength values for the same set of structural ceramic materials. Compressive strength was determined using the uniaxial method developed by Tracy, described in "A compressive test for high strength ceramics" J. Test. and Eval. 15 14–19 (1987). This low compressive strength is also manifested in a lower than expected hardness from consideration of the material's Young's Modulus. FIG. 4 illustrates the relationship found between Vickers Hardness measured at loads greater than 0.5 kgs and Young's Modulus for the same range of structural ceramics. FIG. 5 illustrates the relationship found between the load independent Knoop hardness calculated from 0.1, 0.5 and 1.0 kg load Knoop hardness values and Young's Modulus for the same range of structural ceramics. Knoop and Vickers hardness were determined according to ASTM standard E384. Load independent Knoop hardness is calculated according to the method of Li et al, described in "Indentation Fracture Toughness of Sintered Silicon Carbide in the Palmqvist Crack Regime" J. Amer. Ceram. Soc. 72 904–911 (1989). For both methods of hardness determination there is a strong linear correlation between the material hardness number and Young's modulus for most materials. $TiB_2$, TiN, and AlN materials however show greater "plasticity".

It should be noted that this low compressive strength and lower than expected hardness is observed in fully dense bodies (i.e. bodies having densities close to the theoretical density with low porosity), and is not due to gross microstructural flaws. Secondly, although it is believed there is some dependence of both compressive strength and hardness on grain size, this alone is not sufficient to account for the lower values. Finally the materials exhibiting these properties were for the most part fine grained, with a mean grain size less than 5 microns.

The reasons for this observed behavior are not currently understood, but it is postulated that compressive strength is a property of primary importance to ballistic behavior, possibly having a major influence on the formation of a fracture conoid. More specifically a low compressive strength is believed responsible for the superior ballistic performance of $TiB_2$, TiN and AlN.

The concept of this invention is then that any high elastic modulus ceramic or cermet material possessing a low compressive strength or a lower than expected hardness from consideration of the elastic modulus will perform well as armor, particularly against the heavy metal Tungsten and Depleted Uranium penetrators. Young's Modulus is preferably greater than 200 GPa, more preferably greater than 300 GPa, while compressive strength is preferably less than 5.5 GPa, more preferably less than 5.0 GPa. In particular $TiB_2$, TiN, AlN, and Cermet or Composite materials containing these ceramics will exhibit good ballistic performances.

Of particular interest for the purposes of tailoring armor properties are composite materials manufactured from combinations of these three ceramics, such as;

$TiB_2$—TiN—AlN
$TiB_2$—AlN
TiN—$TiB_2$
TiN—AlN

Graded armor materials from these three ceramics are thus possible which provide a high elastic impedance impact face of $TiB_2$ or TiN, or alternatively $TiB_2$ rich and/or TiN rich composite. This graded armor material then becomes increasingly AlN rich moving to the back face furthest from impact, providing a body which has low compressive strength throughout, but which has lower density than if the entire body were fabricated from the composition of the impact face.

Examples of further useful composite systems which could be graded are as follows;

TiN—Si₃N₄

TiN—TZP (where TZP is tetragonal zirconia polycrystal)

Again graded armor materials from these ceramics are possible which provide a high elastic impedance impact face of TiN or TiN rich composite. The graded armor material then becomes increasingly rich in either $Si_3N_4$ or TZP moving to the back face furthest from impact, such that the material adjacent to this face has higher tensile and compressive strength.

The ceramic materials based upon TiN or TiN/AlN can be manufactured using the conventional hot pressing process, or a sintering process, or a sinter-HIP process, or an encapsulated HIP process. The sintering process is preferred since this is a simpler, more economical process requiring less expensive equipment. These materials have a manufacturing advantage over current armor materials mentioned earlier since any of the densification processes can be performed at significantly lower temperatures. These materials can also be densified much more readily by sintering allowing the manufacture of more complex shapes than tiles.

The starting materials for densification by the aforementioned processes may be conveniently prepared by mixing or milling together the desired constituents to yield a fine homogeneous powder. The constituent powders preferably have a median particle size of less than 5 microns. Where required, green bodies may be formed of the desired shape by any of the techniques known in the art, such as by die pressing, isostatic pressing, extrusion, injection molding or slip casting.

The following examples are to be viewed as illustrative of the present invention and should not be viewed as limiting the scope of the invention as defined by the appended claims. All raw material powders listed in the examples have median particle sizes of less than 5 microns, and less than 1000 ppm of metallic impurities. Oxygen contents of TiN and AlN powders were 1.2 and 1.5 % respectively.

EXAMPLE 1

95 t % TiN and 5 wt % AlN are milled together in 2-propanol solvent using an attrition mill. The resultant slurry is dried at 80° C., then screened through an 80 mesh screen. The screened powder is loaded into a boron nitride coated graphite die assembly. The die assembly is placed within the induction coil of a hot press. The temperature is raised to 800° C. and held for 30 minutes to allow outgassing of the powder and the graphite parts under flowing $N_2$ gas. The temperature and pressure are then increased to 1,800° C. and 5,000 psig respectively. The temperature and pressure are held at these values for sufficient time to complete densification. The densified material is allowed to cool in the die to room temperature and then recovered. The product of the process has the desired high density (greater than 98% theoretical density) and high elastic modulus (greater than 400 GPa) with a low compressive strength (less than 5GPa).

EXAMPLE 2

90 wt % TiN, 5 wt % AlN, 4 wt % Ni and 1 wt % Mo are milled together in 2-propanol solvent using an attrition mill. The resultant slurry is dried at 80° C., then screened through an 80 mesh screen. The screened powder is loaded into a boron nitride coated graphite die assembly. The die assembly is placed within the induction coil of a hot press. The temperature is raised to 800° C. and held for 30 minutes to allow outgassing of the powder and the graphite parts under flowing $N_2$ gas. The temperature and pressure are then increased to 1,700° C. and 5,000 psig respectively. The temperature and pressure are held at these values for sufficient time to complete densification. The densified material is allowed to cool in the die to room temperature and then recovered. The product of this process has the desired high density (greater than 98% theoretical density) and high elastic modulus (greater than 350 GPa) with a low compressive strength (less than 5.5 GPa).

EXAMPLE 3

90 wt % AlN and 10 wt % TiN are milled together in 2-propanol solvent using an attrition mill. The resultant slurry is dried at 80° C., then screened through an 80 mesh screen. The screened powder is loaded into a boron nitride coated graphite die assembly. The die assembly is placed within the induction coil of a hot press. The temperature is raised to 800° C. and held for 30 minutes to allow outgassing of the powder and the graphite parts under flowing $N_2$ gas. The temperature and pressure are then increased to 1,800° C. and 5,000 psig respectively. The temperature and pressure are held at these values for sufficient time to complete densification. The densified material is allowed to cool in the die to room temperature and then recovered. The product of this process has the desired high density (greater than 98% theoretical density) and high elastic modulus (greater than 300 GPa) with a low compressive strength (less than 5.5 GPa).

EXAMPLE 4

92 wt % TiN and 4 wt % AlN are milled together with 2 wt % $Al_2O_3$ and 2 wt % $Y_2O_3$ sintering aids in 2-propanol solvent using an attrition mill. The resultant slurry is dried at 80° C., then screened through an 80 mesh screen. The screened powder is isostatically pressed at 45,000 psi to provide a green compact. The green compact is placed in a bed of high purity boron nitride powder within a graphite pot. The graphite pot is placed in a graphite resistance heated furnace. The temperature is raised to 1,000° C. under vacuum and held for 120 minutes to allow outgassing of the compacted part, the boron nitride powder bed and the graphite parts. The temperature and pressure are then increased to 1,800° C. and 4 psig $N_2$ respectively. The temperature and pressure are held at these values for approximately 120 minutes, sufficient time to give closed porosity at the surface of the part. The temperature and pressure are then increased to 1,900° C. and 280 psig $N_2$ respectively. The temperature and pressure are held at these values for sufficient time to complete densification. The densified material is allowed to cool in the furnace to room temperature and then recovered. The product of this process has the desired high density (greater than 98% theoretical density) and high elastic modulus (greater than 400 GPa) with a low compressive strength (less than 5 GPa).

EXAMPLE 5

59.1 wt % TiN and 36.9 wt % AlN are milled together with 2.0 wt % $Al_2O_3$ and 2.0 wt % $Y_2O_3$ sintering aids in 2-propanol solvent using an attrition mill. The resultant slurry is dried at 80° C., then screened through an 80 mesh screen. The screened powder is isostatically pressed at 45,000 psi to provide a green compact. The green compact is placed in a bed of high purity boron nitride powder within a graphite pot. The graphite pot is placed in a graphite resistance heated furnace. The temperature is raised to 1,000° C. under vacuum and held for 120 minutes to allow outgassing of the compacted part, the boron nitride powder bed and the graphite parts. The temperature and pressure are then increased to 1,800° C. and 4 psig $N_2$ respectively. The temperature and pressure are held at these values for approximately 120 minutes, sufficient time to give closed porosity at the surface of the part. The temperature and pressure are then held at these values for sufficient time to complete densification. The densified material is allowed to cool in the furnace to room temperature and then recovered. The product of this process has the desired high density (greater than 98% theoretical density) and high elastic modulus (greater than 350 GPa) with a low compressive strength (less than 5.5 GPa).

EXAMPLE 6

9.6 wt % TiN and 86.4 wt % AlN are milled together with 2.0 wt % $Al_2O_3$ and 2.0 wt % $Y_2O_3$ sintering aids in 2-propanol solvent using an attrition mill. The resultant slurry is dried at 80° C., then screened through an 80 mesh screen. The screened powder is isostatically pressed at 45,000 psi to provide a green compact. The green compact is placed in a bed of high purity boron nitride powder within a graphite pot. The graphite pot is placed in a graphite resistance heated furnace. The temperature is raised to 1,000° C. under vacuum and held for 120 minutes to allow outgassing of the compacted part, the boron nitride powder bed and the graphite parts. The temperature and pressure are then increased to 1,900° C. and 280 psig $N_2$ respectively. The temperature and pressure are held at these values for sufficient time to complete densification. The densified material is allowed to cool in the furnace to room temperature and then recovered. The product of this process has the desired high density (greater than 98% theoretical density) and high elastic modulus (greater than 300 GPa) with a low compressive strength (less than 5.5 GPa).

EXAMPLE 7

61.6 wt % TiN 32.5 wt % $Si_3N_4$ and 1.6 wt % AlN are milled together with 2.0 wt % $Al_2O_3$ and 2.3 wt % $Y_2O_3$ sintering aids in 2-propanol solvent using an attrition mill. The resultant slurry is dried at 80° C., then screened through an 80 mesh screen. The screened powder is isostatically pressed at 45,000 psi to provide a green compact. The green compact is placed in a bed of high purity boron nitride powder within a graphite pot. The graphite pot is placed in a graphite resistance heated furnace. The temperature is raised to 1,000° C. under vacuum and held for 120 minutes to allow outgassing of the compacted part, the boron nitride powder bed and the graphite parts. The temperature and pressure are then increased to 1,750° C. and 30 psig $N_2$ respectively. The temperature and pressure are held at these values for approximately 120 minutes, sufficient time to give closed porosity at the surface of the part. The temperature and pressure are then increased to 1,850° and 280 psig $N_2$ respectively. The temperature and pressure are held at these values for sufficient time to complete densification. The densified material is allowed to cool in the furnace to room temperature and then recovered. The product of this process has the desired high density (greater than 98% theoretical density) and high elastic modulus (greater than 300 GPa) with a low compressive strength (less than 5.5 GPa).

EXAMPLE 8

80 wt % TiN is milled together with 2 wt % $Al_2O_3$ and 18 wt % TZP (TZP composed of 94.8 wt % ZrO2 and 4.2 wt % $Y_2O_3$) sintering aids in 2-propanol solvent using an attrition mill. The resultant slurry is dried at 80° C., then screened through an 80 mesh screen. The screened powder is isostatically pressed at 45,000 psi to provide a green compact. The green compact is placed in a bed of high purity boron nitride powder within a graphite pot. The graphite pot is placed in a graphite resistance heated furnace. The temperature is raised to 1,000° C. under vacuum and held for 120 minutes to allow outgassing of the compacted part, the boron nitride powder bed and the graphite parts. The temperature and pressure are then increased to 1,800° C. and 30 psig $N_2$ respectively. The temperature and pressure are held at these values for approximately 120 minutes sufficient time to give closed porosity at the surface of the part. The temperature and pressure are then increased to 1,900° C. and 280 psig $N_2$ respectively. The temperature and pressure are held at these values for sufficient time to complete densification. The densified material is allowed to cool in the furnace to room temperature and then recovered. The product of this process has the desired high density (greater than 98% theoretical density) and high elastic modulus (greater than 300 GPa) with a low compressive strength (less than 5.5 GPa).

EXAMPLE 9

Several TiN-AlN composite mixtures are milled separately with 2 wt % $Al_2O_3$ and 2 wt % $Y_2O_3$ sintering aids in 2-propanol solvent using an attrition mill as follows; mixture A: 92.0 wt % TiN and 4.0 wt % AlN; mixture B: 83.0 wt % TiN and 13.0 wt % AlN; mixture C: 59.1 wt % TiN and 36.9 wt % AlN; mixture D: 27.5 wt % Tin and 68.5 wt % AlN; mixture E: 9.6 wt % TiN and 86.4 wt % AlN. At the end of milling 6% Stearic Acid predissolved in 2-propanol is mixed with each resultant slurry. Each slurry is dried at 80° C., then screened through an 80 mesh screen. The screened powder containing Stearic Acid lubricant is die pressed at low pressure <5,000 psig to provide a flat tile. The pressed tiles are heated to 500° C. in 95% nitrogen −5% hydrogen to burn out the Stearic Acid binder lubricant. The burned out tiles are stacked in order A to E, then loaded into a boron nitride coated graphite die assembly. The die assembly is placed within the induction coil of a hot press. The temperature is raised to 800° C. and held for 30 minutes to allow outgassing of the powder and the graphite parts under flowing $N_2$ gas. The temperature and pressure are then increased to 1,800° C. and 5,000 psig respectively. The temperature and pressure are held at these values for sufficient time to complete densification. The densified material is allowed to cool in the die to room temperature and then recovered. The product of this process is a graded ceramic tile with discrete layers intimately bonded together by the densification process. Each layer of the densified product has the desired high density greater than 98% of the theoretical density for the composition of that layer. The elastic modulus decreases from side A having a modulus of approximately 440 GPa through layers B, C, D, having elastic moduli of approximately 400, 360, 330 GPa respectively to side E having an elastic modulus of approximately 310 GPa. A high elastic modulus and elastic impedance face is provided by the side composed predominantly of TiN, while the body has a lower density than if the entire body were composed predominantly of TiN. The body also exhibits a low compressive strength throughout, less than 5.5 GPa.

EXAMPLE 10

Several TiN-AlN composite mixtures are milled separately with 2 wt % $Al_2O_3$ and 2 wt % $Y_2O_3$ sintering aids in 2-propanol solvent using an attrition mill as follows; mixture A: 92.0 wt % TiN and 4.0 wt % AlN; mixture B: 83.0 wt % TiN and 13.0 wt % AlN; mixture C: 59.1 wt % TiN and 36.9 wt % AlN; mixture D: 27.5 wt % TiN and 68.5 wt % AlN; mixture E: 9.6 wt % TiN and 86.4 wt % AlN. At the end of milling 6% Stearic Acid predissolved in 2-propanol is mixed with each resultant slurry. Each slurry is dried at 80° C., then screened through an 80 mesh screen. The screened powder containing Stearic Acid lubricant is die pressed at low pressure, less than 5,000 psig to provide a flat tile. The pressed tiles are stacked in order A to E, loaded into a rubber bag and isostatically pressed at 45,000 psi to provide a single compact from the component tiles. The green compact is heated to 500° C. in 95% nitrogen 5% hydrogen to burn out the Stearic Acid binder lubricant, then it is spray coated with boron nitride slurry, dried and placed in a graphite pot. The graphite pot is placed in a graphite resistance heated hot isostatic press. The temperature is raised to 1,000° C. under vacuum and held for 60 minutes to allow outgassing of the compacted part, the boron nitride coating and the graphite parts. The temperature and pressure are then increased to 1,800° C. and 30 psig $N_2$ respectively. The temperature and pressure are held at these values for approximately 120 minutes, sufficient time to give closed porosity at the surface of the part. With the temperature held constant at 1800° C. the pressure is then increased to 29,000 psig $N_2$. The temperature and pressure are held at these values for sufficient time to complete densification. The densified material is allowed to cool in the furnace to room temperature while pressure is reduced, and then recovered. The product of this process is a graded ceramic tile with discrete layers intimately bonded together by the densification process. Each layer of the densified product has the desired high density greater than 98% of the theoretical density for the composition of that layer. The elastic modulus decreases from side A having a modulus of approximately 440 GPa through layers B, C. D, having elastic moduli of approximately 400, 360, 330 GPa respectively to side E having an elastic modulus of approximately 310 GPa. A high elastic modulus and elastic impedance face is provided by the side composed predominantly of TiN, while the body has a lower density than if the entire body were composed predominantly of TiN. The body also exhibits a low compressive strength throughout, less than 5.5 GPa.

EXAMPLE 11

Several TiN-AlN composite mixtures are milled separately with 2 wt % $Al_2O_3$ and 2 wt % $Y_2O_3$ sintering aids in 2-propanol solvent using an attrition mill as follows; mixture A: 92.0 wt % TiN and 4.0 wt % AlN; mixture B: 83.0 wt % TiN and 13.0 wt % AlN; mixture C: 59.1 wt % TiN and 36.9 wt % AlN; mixture D: 27.5 wt % TiN and 68.5 wt % AlN; mixture E: 9.6 wt % TiN and 86.4 wt % AlN. At the end of milling 6% Stearic Acid predissolved in 2-propanol is mixed with each resultant slurry. Each slurry is dried at 80° C., then screened through an 80 mesh screen. The screened powder containing Stearic Acid lubricant is die pressed at low pressure <5,000 psig to provide a flat tile. The pressed tiles are stacked in order A to E, loaded into a rubber bag and isostatically pressed at 45,000 psi to provide a single compact from the component tiles. The green compact is heated to 500° C. in 95% nitrogen −5% hydrogen to burn out the Stearic Acid binder lubricant, then it is placed in a bed of high purity boron nitride powder within a grahite pot. The graphite pot is placed in a graphite resistance heated furnace. The temperature is raised to 1,000° C. under vacuum and held for 120 minutes to allow outgassing of the compacted part, the boron nitride powder bed and the graphite parts. The temperature and pressure are then increased to 1,800° C. and 4 psig $N_2$ respectively. The temperature and pressure are held at these values for approximately 120 minutes, sufficient time to give closed porosity at the surface of the part. The temperature and pressure are then increased to 1,900° C. and 280 psig $N_2$ respectively. The temperature and pressure are held at these values for sufficient time to complete densification. The densified material is allowed to cool in the furnace to room temperature and then recovered. The product of this process is a graded ceramic tile with discrete layers intimately bonded together by the sintering process. Each layer of the densified product has the desired high density greater than 98% of the theoretical density for the composition of that layer. The elastic modulus decreases from side A having a modulus of approximately 440 GPa through layers B, C, D, having elastic moduli of approximately 400, 360, 330 GPa respectively to side E having an elastic modulus of approximately 310 GPa. A high elastic modulus and elastic impedance face is provided by the side composed predominantly of TiN, while the body has a lower density than if the entire body were composed predominantly of TiN. The body also exhibits a low compressive strength throughout (less than 5.5 GPa).

I claim:

1. A densified armor material consisting essentially of a sintered mixture of titanium nitride and aluminum nitride, said armor material having a theoretical density of greater than 98 percent, a Young's modulus of greater than 300 GPa and a compressive strength of less than 5.5 GPa.

2. The densified armor material of claim 1 wherein the sintered mixture contains from about 6 to about 96 percent by weight titanium nitride.

3. The densified armor material of claim 1 wherein the sintered mixture further contains less than 5 weight percent of aluminum, iron, nickel, cobalt, or molybdenum or mixtures thereof.

4. The densified armor material of claim 1 wherein the sintered mixture further contains aluminum oxide and yttrium oxide.

5. A densified armor material consisting essentially of a sintered mixture of titanium nitride and silicon nitride, said armor having a theoretical density greater than 98 percent, a Young's modulus of greater than 300 GPa and a compressive strength of less than 5.5 GPa.

6. The densified armor material of claim 5 wherein the sintered mixture contains from about 40 to about 96 percent by weight titanium nitride.

7. The densified armor material of claim 5 wherein the sintered mixture further contains less than 5 weight percent of aluminum, iron, nickel, cobalt, or molybdenum or mixtures thereof.

8. The densified armor material of claim 5 wherein the sintered mixture further contains aluminum nitride, aluminum oxide and yttrium oxide.

9. A densified armor material consisting essentially of a sintered mixture of titanium nitride and tetragonal zirconia polycrystal, said armor material having a theoretical density greater than 98 percent, a Young's modulus greater than 300 GPa and a compressive strength of less than 5.5 GPa.

10. The densified armor material of claim 9 wherein the sintered mixture contains from about 40 to about 96 weight percent titanium nitride.

11. The densified armor material of claim 9 wherein the sintered mixture further contains less than 5 weight percent of aluminum, iron, nickel, cobalt, or molybdenum or mixtures thereof.

12. The densified armor material of claim 9 wherein the sintered mixture further contains aluminum oxide.

13. A densified armor material comprising a body having an impact receiving surface and an oppositely positioned surface, said body consisting essentially of sintered mixtures of titanium and aluminum nitride, said body adjacent to said impact receiving surface having an amount of titanium nitride greater than said oppositely positioned surface, said impact receiving surface having a Young's modulus greater than about 400 MPa and a density greater than about 4.8 grams cm$^{-3}$, said oppositely positioned surface having a Young's modulus greater than about 300 MPa and a density less than about 3.7 grams cm$^{-3}$ whereby there is a gradation of body composition, density and Young's modulus from the impact receiving surface to the opposite surface, said body having a compressive strength less than 5.5 GPa.

14. The densified armor material of claim 13 wherein said body adjacent to said impact receiving surface contains greater than 90 weight percent titanium nitride and said body adjacent to said oppositely positioned surface contains less than 10 weight percent titanium nitride.

15. The densified armor material of claim 13 wherein the sintered mixture further contains aluminum oxide and yttrium oxide.

16. A densified armor material comprising a body having an impact receiving surface and an oppositely positioned surface, said body consisting essentially of sintered mixtures of titanium nitride and silicon nitride, said body adjacent to said impact receiving surface having an amount of titanium nitride greater than said oppositely positioned surface, said impact receiving surface having a Young's modulus greater than about 400 MPa and a density greater than about 4.8 grams cm$^{-3}$, said oppositely positioned surface having a Young's modulus greater than about 200 MPa and a density less than about 3.7 grams cm$^{-3}$ whereby there is a gradation of body composition, density and Young's modulus from the impact receiving surface to the opposite surface.

17. A densified armor material comprising a body having an impact receiving surface and an oppositely positioned surface, said body consisting essentially of sintered mixtures of titanium nitride and tetragonal zirconia polycrystal, said body adjacent to said impact receiving surface having an amount of titanium nitride greater than said oppositely positioned surface, said impact receiving surface having a Young's modulus greater than about 400 MPa and a density greater than about 4.8 grams cm$^{-3}$, said oppositely positioned surface having a Young's modulus greater than about 200 MPa and a density less than about 6.1 grams cm$^{-3}$ whereby there is a gradation of body composition, density and Young's modulus from the impact receiving surface to the opposite surface.

* * * * *